(12) United States Patent
Niemi

(10) Patent No.: US 7,509,652 B2
(45) Date of Patent: Mar. 24, 2009

(54) EVENT RELATED COMMUNICATIONS

(75) Inventor: Aki Niemi, Espoo (FI)

(73) Assignee: Nokia Corporation, Espoo (FI)

( * ) Notice: Subject to any disclaimer, the term of this patent is extended or adjusted under 35 U.S.C. 154(b) by 550 days.

(21) Appl. No.: 10/492,078

(22) PCT Filed: Oct. 7, 2002

(86) PCT No.: PCT/IB02/04566

§ 371 (c)(1),
(2), (4) Date: May 13, 2004

(87) PCT Pub. No.: WO03/032606

PCT Pub. Date: Apr. 17, 2003

(65) Prior Publication Data

US 2004/0260553 A1    Dec. 23, 2004

(30) Foreign Application Priority Data

Oct. 9, 2001 (EP) .................... 0124261

(51) Int. Cl.
G06F 9/54 (2006.01)
G06F 15/16 (2006.01)

(52) U.S. Cl. ................ 719/318; 709/205

(58) Field of Classification Search ............ 719/318; 709/205
See application file for complete search history.

(56) References Cited

U.S. PATENT DOCUMENTS

| | | | |
|---|---|---|---|
| 6,701,366 B1 * | 3/2004 | Kallas et al. | 709/227 |
| 6,993,771 B1 * | 1/2006 | Hasha et al. | 719/318 |
| 7,170,863 B1 * | 1/2007 | Denman et al. | 370/260 |
| 7,185,094 B2 * | 2/2007 | Marquette et al. | 709/225 |
| 2002/0120746 A1 * | 8/2002 | Patil et al. | 709/227 |
| 2002/0131395 A1 * | 9/2002 | Wang | 370/349 |
| 2003/0009463 A1 * | 1/2003 | Gallant | 707/10 |
| 2003/0040280 A1 * | 2/2003 | Koskelainen | 455/67.1 |
| 2003/0161296 A1 * | 8/2003 | Butler et al. | 370/352 |
| 2003/0187992 A1 * | 10/2003 | Steenfeldt et al. | 709/227 |

FOREIGN PATENT DOCUMENTS

EP    1 096 766 A2    5/2001

(Continued)

OTHER PUBLICATIONS

Jonathan Rosenberg, Jun. 1999 "programming internet telephony services". S. Bessler, Jun. 14, 2001 "a service platform for internet-telecom services using SIP".*

(Continued)

Primary Examiner—Li B Zhen
Assistant Examiner—Abdou K Seye
(74) Attorney, Agent, or Firm—Squire, Sanders & Dempsey L.L.P.

(57) ABSTRACT

A method in a communication system wherein a requestor (18) signals a request (1) for a service associated with an event. The request includes a first identifier for identifying the requested event and a second identifier for identifying the origin of the event. An executable set of instructions is then selected based on the first and second identifiers. Communications associated with the specific event is then controlled by means of the selected executable set of instructions. A communication system and a service execution entity (12) operating in accordance with the method is also disclosed.

21 Claims, 2 Drawing Sheets

FOREIGN PATENT DOCUMENTS

EP   1 100 280 A2   5/2001
WO   WO 01/47212 A1   6/2001

OTHER PUBLICATIONS

Rosenberg et al, "Programming Internet Telephony Services", IEEE Network, IEEE Inc., vol. 13, No. 3, May 1999, pp. 42-49, XP000870630.

Bhatia et al, "PHP: Hypertext Preprocessor for SIP", IETF Internet Draft, Jul. 2001, pp. 1-8, XP002189883.

A. Roach, "SIP-Specific Event Notification", IETF Internet Draft, Jul. 2001, pp. 1-32, XP002189884.

Rosenberg et al, "SIP Extensions for Presence", IETF Internet Draft, Mar. 2, 2001, pp. 1-39, XP002189885.

* cited by examiner

EVENT RELATED COMMUNICATIONS

FIELD OF THE INVENTION

The present invention relates to communications in association with user specific events, and more particularly, but not exclusively, to provision of services by a user to other users of a communication system.

BACKGROUND OF THE INVENTION

A data communication system is arranged for communication of data between two or more entities such as user terminal equipment and/or other nodes associated with the system. The communication may comprise, for example, communication of voice, electronic mail (email) and text messages, multimedia content and so on. A communication system may provide data communication over a fixed line or wireless interface for user terminals or other nodes. An example of systems carrying wireless communication is the public land mobile network (PLMN). An example of the fixed line networks is the public switched telephone network (PSTN)

A communication system typically operates in accordance with a given standard or specification which sets out what the various elements of the system are permitted to do and how that should be achieved. For example, the standard or specification may define if the user, or more precisely, user equipment or terminal is provided with a circuit switched service or a packet switched service or both. Communication protocols and/or parameters which shall be used for the connection are also typically defined. For example, the manner how communication shall be implemented between the user equipment and the elements of the communication network is typically based on a predefined communication protocol. In other words, a specific set of "rules" on which the communication can be based on needs to be defined to enable communication by means of the communication system.

The communication systems may be provided with various different functions. These functions can be divided in different categories. A category comprises functions that relate to the actual carrying of the communication in the system. Another category can be seen as being formed by control or management functions such as the control of various services. The various functions of the communication systems may have been developed quite independently from each other and may use different protocols in different communication systems. In general terms, a communication system can be described by a model in which the functions of the system can be seen as divided in several hierarchically arranged function layers, such as a service layer, an application layer and a transport layer.

For example, in communication environments such as those based on the Internet Protocol (IP) or the Session Initiation Protocol (SIP) or the current third generation (3G) communication network architectures it is assumed that various server entities are used for handling of provision of different communication services and other functions of the communication system. In such communication systems the communication connections may not be based on a "circuit" between the communicating nodes, but the messages may rather be transported as packets that are provided with an address.

Hence the name packet switched systems. The server entities and the user equipment may communicate with each other based on appropriate protocol providing such a connectionless operation.

The internet protocol (IP) is a layer 3 protocol that underlies the application layer in a layered communication system function model. The Session Initiation Protocol (SIP) in turn is an application-layer control protocol for creating, modifying and terminating sessions with one or more participants. A user connected to a SIP based communication system may communicate with various entities of the communication system based on standardised SIP messages.

The global Internet has proven to be a popular and wide spread data communication system for provision of different services for the users thereof. The services are typically provided by the so called Internet Service Providers (ISPs). In addition to provision of the communication services itself (i.e. the possibility to communicate via the system), content services such as different web sites are also provided. The content can have any form, such as various information, multimedia and so on.

One of the reasons why the Internet has become so popular is the possibility of the users to provide content that can then be viewed or otherwise used by other users. A widely used possibility for content creation is to use World Wide Web (WWW) content creation tools such as the Hypertext Preprocessor (PHP). The content creation tools have been successfully implemented in numerous web server platforms, and are used by numerous web sites in the Internet. The sites may use the tools to create for example dynamic web content.

The inventor has found that it could be advantageous if the existing WWW service tools could be used for creating services and/or other content for users of other communication environments that are based on other protocols than the HyperText Transfer Protocol (HTTP) of the WWW service. For example, users of a Session Initiation Protocol (SIP) based communication system might wish to create content and/or services for other users communicating via the SIP environment. A SIP service provider (e.g. an operator) may also wish to utilise the creativity of its user base in creating new services and other content, thereby making his service more attractive. This might also free the SIP service provider from the provision of a number of services and other content. Instead, the service provider might concentrate on to collectively provide a few basic, standard services required for the operation of the communication system. Running of powerful scripts on operator servers may also create some security concerns.

SUMMARY OF THE INVENTION

Embodiments of the present invention aim to address one or several of the above problems.

According to one aspect of the present invention, there is provided a method in a communication system, the method comprising the steps of signaling from a requestor a request for a service associated with a user specific event, the request including a first identifier for identifying the requested event and a second identifier for identifying the origin of the event, selecting an executable set of instructions based on the first and second identifiers, and controlling communications associated with the user specific event by means of the selected executable set of instructions.

According to another aspect of the present invention there is provided a communication system, comprising means for provision of a user specific event, wherein a user equipment is enabled to request for a service associated with the user specific event by means of a request including a first identifier for identifying the event and a second identifier for identifying the means providing the user specific event, and a service execution environment for running an executable set of instructions for controlling communications associated with the user specific event, the set of executable instructions being selected based on the first and second identifiers.

According to a still other aspect of the present invention there is provided a service execution entity. The service execution entity comprises means for receiving a request for a service associated with a user specific event, said request including a first identifier for identifying the event and a second identifier for identifying the means providing the user specific event, means for selecting an executable set of instructions for controlling communications associated with the user specific event based on the first and second identifiers, and means for communicating messages to the user equipment.

In a more specific form the first identifier is mapped into executable sets of instructions during the selection. The selected executable set of instructions may be fetched from a storage means.

The requestor may subscribe to the event by generating a request by a user equipment and by transmitting the generated request from the user equipment to a server entity of the communication network. The request may expire after a defined time.

The requester may subscribe to the event by sending a SIP SUBSCRIBE message. Information may be transported from an entity executing said executable set of instructions in a SIP NOTIFY message.

The executable set of instructions may be arranged for monitoring for a change in the state of the event. A message may be transmitted to the requester in response to detection of a change in the state of the event.

The second identifier may comprise an address of the origin of the event.

An event package may registered for the event in an event package directory.

The set of executable instructions may subscribe to another event.

The embodiments of the invention may provide an easy to implement way of communicating upon request information that associates with user specific events. A service architecture may be provided that leverages on the resources of the open source community in creating new service concepts and/or in provisioning of content for users of a communication system. Existing service creation tools may be used for creating services and/or other content.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
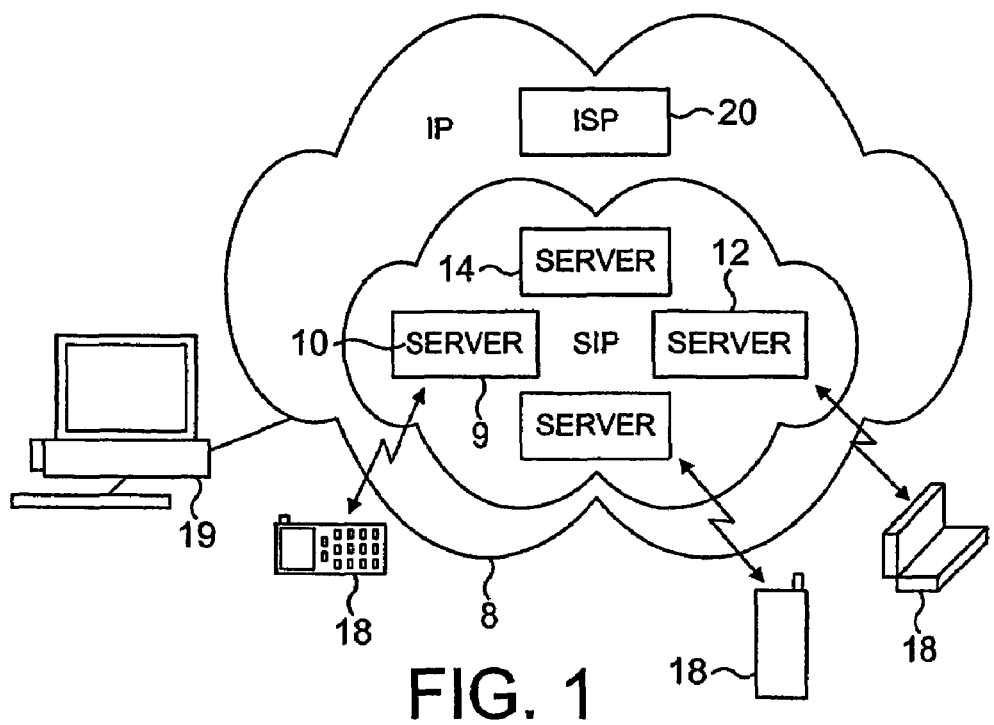
FIG. 1 shows a communication system wherein the present invention can be applied.

Reference is made to schematic block diagram of FIG. 1. User equipment 18 may be in communication with respective wireless interfaces with servers 10, 12 and 14 of a first communication system 9. The first communication system is arranged to operate in a Session Initiation Protocol (SIP) environment. That is, each of the users 18 subscribes to a communication system that is based on the SIP protocol and is served by a SIP service provider. In a typical arrangement the SIP service provider operates the SIP network servers.

The SIP is an application-layer control protocol for creating, modifying and terminating sessions with one or more participants. A feature of the SIP is that since it operates on the application level it is not dependent on a particular transport layer protocol. The SIP can thus use various transport protocols. Examples of the possible protocols include the UDP (User Datagram Protocol), TCP (Transmission Control Protocol), and the SCTP (Stream Control Transmission Protocol). SIP is not dependent on any other of the protocols of the underlying layers either, such as the layer 3 IP or the layer 2 technologies such as the WLAN, LAN, PPP, avian carriers and so on.

The user equipment 18 may communicate with the various entities 10, 12, and 14 of the communication system based on SIP standard messages. The entities may comprise entities such as a SIP proxy server 10, a service execution environment 12, and a presence server 14.

For example, the presence server can be used for provision of the so called 'presence' service. In short, the presence service is a service that is arranged to provide those who have subscribed to the service with information regarding the presence status of a specific subscriber. The presence service has proven to be, at leas at the present, a substantially popular SIP service. The presence service may be used by a SIP user, for example, to check the status of a person he wishes to make a call before even trying to establish a call connection. A more detailed description of the presence service can be found from $3^{rd}$ Generation Partnership Project (3GPP) Technical specification 3GPP TS 22.141 'Presence Service' (version 1.0.0. 2001-06).

The elements required for the connection between the network apparatus of the first communication system 10 and the user equipment 18 and the user equipment as such do not form an essential element of the present invention, and therefore these are not shown or described in any greater detail. It is sufficient to note that e.g. mobile stations may communicate with base stations of a cellular communication system over a wireless interface. The mobile stations may be provided with user interface means such as a display and input or control buttons, although this is not always necessary. A mobile station may comprise also processor and data storage means for enabling use thereof for data communication operations. It shall be appreciated that although FIG. 1 shows mobile user equipment 18 for communication via the SIP environment 9, user equipment may interface the SIP environment 9 via a fixed connection.

FIG. 1 shows also a second communication system 8 that operates in accordance with a second protocol, and more particularly, in accordance with the internet protocol (IP). An internet service provider (ISP) entity 20 is shown to be provided in the IP environment 8. An Internet enabled terminal, and more particularly, a personal computer (PC) terminal 19 is shown to be connected to the Internet 8.

Figure 2:
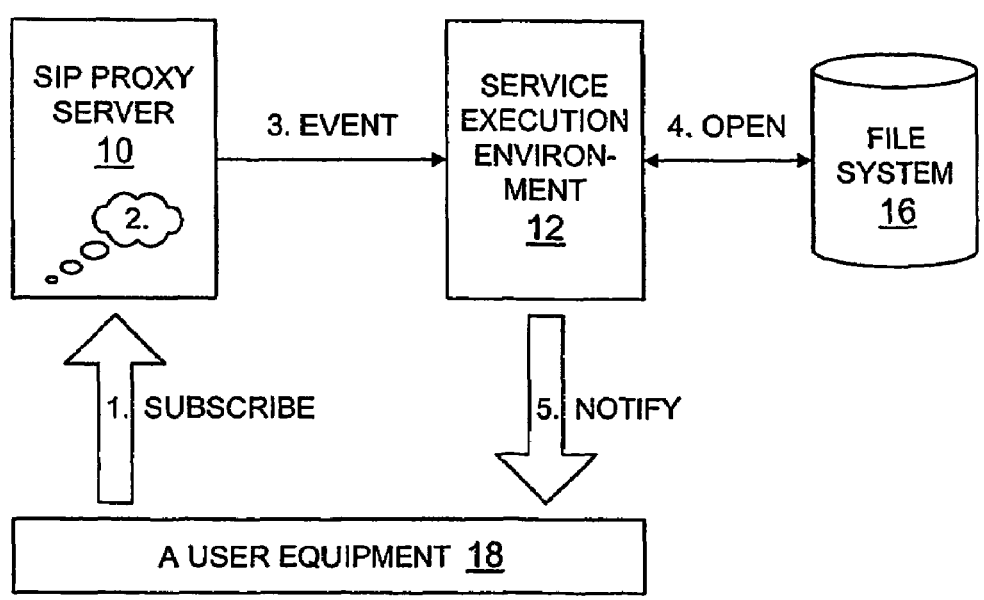
FIG. 2 shows one embodiment of the present invention.

Reference is now also made to schematic block diagram of FIG. 2 showing the overall structure of a service platform embodying the present invention. A user 18 is shown to be in communication with a SIP proxy server entity 10 and a service execution environment 12 based on the Session Initiation Protocol (SIP) standard messages.

In the Session Initiation Protocol (SIP) standard messages and/or requests can be communicated between any SIP enabled entities. For example, a user may use the so called SIP subscribe/notify mechanism to subscribe to certain events by transmitting a SIP 'SUBSCRIBE' message. The occurance of these events is then reported to the user with a SIP NOTIFY message. Those interested may find a more specific description of the SIP subscribe mechanism e.g. from the specifications by IETF (Internet Engineering Task Force) that relate to SIP events.

In addition, a file storage system 16 is also shown. The arrangement is such that the service execution environment 12 may fetch selected data, and more particularly a selected executable set of instructions from the file storage system 16. The data fetching operations will described in more detail later.

The capability of the SIP subscribe/notify mechanism to report events that associate with a particular user can be advantageously used in provision of services that associate with an event which in turn associates with said user. The embodiments described below enable communication of data that associates with user specific events to other users. In a preferred embodiment the SIP subscribe/notify mechanism is used for subscribing and reporting the user specific events.

The term event shall be understood to refer to any event that may be present in the communication system. For example, an event may comprise a dynamic or static mark up language document (e.g. a HTML (Hypertext Markup Language) or XML (Extensible Markup Language) document), or any other entity that may change its state and may associate with a user of the communication system.

A feature of the SIP is the communication of the so called SIP event packages and sub-packages. An SIP event package refers to an data entity that is defined for an event. An event package defines a set of state applied to a specific type of resource, such as the user presence, call state, messaging mailbox state and so on. The set of state may be, for example, statistics, access policy, subscriber lists and so on. The sub-packages in turn can be seen as being a special type of the event packages. A sub-package defines a set of state that can be applied to event packages. A sub-package may also be applied to other sub-packages. With regard to the nature of the event packages and sub-packages a reference can be made to the object oriented analogy.

The event package names may, for example, have the following form: 'service.username.home.nokia.com'. The name of the package could then be used in mapping the event directly to the home directory of "username", and therefore to a script called '~username/public_sipevents/service.php' in said directory. According to another example, an event called 'foo', the event package name for an organisational domain name 'nokia.com' could be 'foo.nokia.com'. Hence, someone sending a SUBSCRIBE request "Event: foo.nokia.com" would receive a NOTIFY message whenever there is a change in the "foo" state.

FIG. 2 is an example of the operation showing the following messages and steps:

1. Subscription from a user equipment 18 is received at a proxy server 10. The SIP 'SUBCRIBE' request may originate from a user equipment 18 such as a mobile station or a fixed line computer terminal.
2. The event-header of the request is parsed at the proxy server 10. That is, the event header is examined to see what has been subscribed (i.e. to find the name of the subscribed event).
3. If it is detected that the request contains an event package, the request and the event package is passed into scripting function at the service execution environment 12. If the request is detected to be standard package, the request/package may be to an appropriate server (e.g. the presence server 14 of FIG. 1).
4. If the request contained an event package, a script associated with the event package is fetched from the storage means 16. This may be accomplished in a manner that is similar to operation of web pages. That is, a user may have a home directory in a file system, and a directory called "~/public_events/" contains php-scripts corresponding directly to these events. For example, an event called "foobar" is subscribed from address sip: aki.niemi@nokia.com, a script called "/home/sipusers/aki.niemi/public_events/foobar.php" is searched for subsequent execution. If the script is invalid or not found, the server may respond e.g. with a SIP standard message "489 Bad event".
5. The script is executed at the service execution environment 12 to monitor any state changes in the subscribed event. If a state change is detected, a SIP 'NOTIFY' message is created and transmitted to the user equipment 18.

The script lifetime may be limited for the subscribed event. This may be done e.g. by setting an expiry parameter in the subscribe request (e.g. an expire-header value in the SIP).

The event packages for specifics event are preferably registered through a centralised authority. For example, an authority such as the IANA (Internet Assigned Numbers Authority) may provide event packages management service.

With the service architecture described with reference to FIG. 2, users could create event packages directly, e.g. by means of the PHP scripting. The user may also publish these packages (with descriptions) on a web page, in catalogues and so on. For example, a HTML code can contain a link such as href="sip:aki.niemi@nokia.com";
methods="SUBSCRIBE"; Event="foobar". In other words, the event names may be in public domain, that is any user may subscribe to an event (e.g. a document) that is publicly announced as being available.

Provision of a feature may also be accomplished by mapping a proprietary event package name to a server side scripting environment. The proprietary event may be defined as an event that is relevant only to the subscriber of the event and/or the provider of the subscribed event.

The scripting environment can be provided by tools such as a Hypertext Preprocessor (PHP) entity, Perl, CGI or any other appropriate technology offering possibility to execute a set of instructions such as a script.

Figure 3:
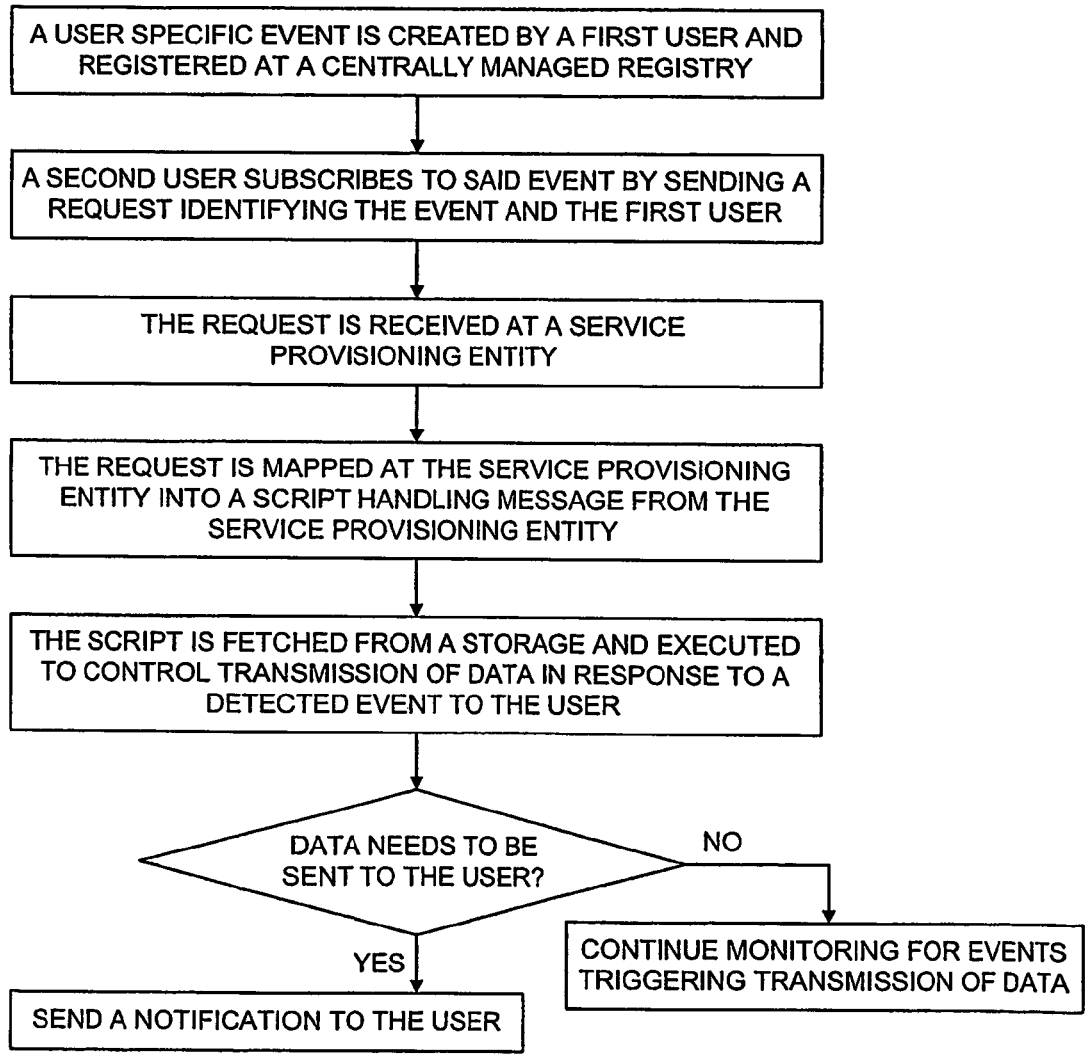
FIG. 3 is a flowchart illustrating the operation of one embodiment of the present invention.

As shown in the Flowchart of FIG. 3, a user specific event has been created by a user. The name of the event is registered at a central name registry entity, such as the IANA. The user specific event is provided for other users who send a SUBSCRIBE message carrying a user specific event identifier i.e. an event package relating to the event. The SUBSCRIBE message may also carry other information such as indication of the accepted NOTIFY payload type in an Accept header.

Upon reception at the service execution environment the identifier is mapped by the service execution environment into a script that handles the reporting of such events. The script is adapted to make a decision when to send a NOTIFY message. The decision may be based on any appropriate factors and information from various information sources. For example, external servers may provide information to support the decision-making.

Such an external source could be a database in association e.g. with a calendar application. A supervising entity in association with the calendar application can then issue event information towards the presence server in response to occurance of said event.

An embodiment provides a service architecture wherein ordinary SIP users 18 could initiate creation and publishing of personal event packages in a manner that is from the user's point of view substantially similar to the maintenance of a personal web page at an Internet Service Provider's web server 20. Content creation tools that are originally intended for use in a different communication environments may be used in the embodiments. For example, the PHP that is conventionally implemented in the HTTP environment 8 may be utilised for provision of content in the SIP environment.

In accordance with a further embodiment information concerning the type of the user's subscription that is carried in the SUBSCRIBE request is mapped to an identifier of the service that supervises the service provisioning. The requested subscription type may be translated by the presence server into the identifier of the supervising entity. The supervising entity may then be invoked to be aware of the subscription made to its supervision activity. After being invoked the supervising entity may push notifications duly to the presence server. Thus the script executing the event can in fact act as a wrapper, or proxy, and itself subscribe to another event. The NOTIFYs from that event may then be simply relayed back to the original subscriber. This may be accomplished transparently to the subscriber of the event.

The above embodiments may require a combination of features of the SIP and a service execution environment, e.g. the PHP. Thus a SIP-PHP mechanism may need to be specified. Necessary SIP-PHP functions and SIP modules may also need to be made available for the SIP servers. The rest of the implementation work is, however, setting up an execution environment similar to that used by a number of the existing HTTP web servers today. Examples of commercially available execution environments include the Apache™.

Various different service applications may be provided by the embodiments. The embodiments benefit from the use of the already existing SIP subscribe/notify mechanism for new tasks.

In accordance with a further embodiment proprietary event packages may be defined using an organisational domain name but in reverse order. For example, for an event called 'foo', the event package name for an organisational domain name 'nokia.com' could be 'com.nokia.foo'. Hence, someone sending a SUBSCRIBE request "Event: com.nokia.foo" would receive a NOTIFY message whenever there is a change in the "foo" state.

It should be appreciated that whilst embodiments of the present invention have been described in relation to mobile stations, embodiments of the present invention are applicable to any other suitable type of user equipment.

It is also noted herein that while the above describes exemplifying embodiments of the invention, there are several variations and modifications which may be made to the disclosed solution without departing from the scope of the present invention as defined in the appended claims.

The invention claimed is:

1. A computerized method, comprising:
   receiving from a requestor a session initiation protocol event message comprising a first identifier that identifies a user specific event created by a user and a second identifier that identifies an origin of the user specific event;
   subscribing the requestor to the event in response to receiving a request generated and transmitted by a user equipment;
   selecting an executable set of instructions based on the first and second identifiers, wherein the selecting comprises mapping the first identifier into executable sets of instructions and fetching the selected executable set of instructions from storage; and
   controlling communications associated with the user specific event with the selected executable set of instructions, wherein the controlling comprises monitoring for a change in a state of the event and transmitting a message to the requestor in response to detection of a change in the state of the event.

2. The method as claimed in claim 1, wherein the executable set of instructions comprises a script.

3. The method as claimed in claim 1, wherein the session initiation protocol event message from the requestor comprises a session initiation protocol SUBSCRIBE message.

4. The method as claimed in claim 1, further comprising:
   transporting information in a session initiation protocol NOTIFY message.

5. The method as claimed in claim 1, further comprising: communicating content to the requestor.

6. The method as claimed in claim 1, wherein the second identifier comprises an address of the origin of the event.

7. The method as claimed in claim 1, wherein the first identifier is included in a header of the request.

8. The method as claimed in claim 1, wherein the request expires after a defined time.

9. The method as claimed in claim 1, further comprising:
   registering of an event package for the event in an event package directory.

10. The method as claimed in claim 1, wherein the set of executable instructions subscribes to another event.

11. The method as claimed in claim 1, wherein the user specific event is a document created by the user.

12. A system, comprising:
   a unit configured to provide a user specific event created by a user;
   a user equipment configured to signal a session initiation protocol event message including a first identifier configured to identify the user specific event and a second identifier configured to identify the unit configured to provide the user specific event, wherein the user equipment is configured to subscribe to the event in response to generating a request and transmitting the request to a server entity of a communication network; and
   an instructions selector configured to select an executable set of instructions based on the first and second identifiers by mapping the first identifier into executable sets of instructions and fetching the selected executable set of instructions from storage;
   a service executor configured to execute the executable set of instructions configured to control communications associated with the user specific event, the instructions, wherein controlling comprises monitoring for a change in a state of the event and transmitting a message to a requestor in response to detection of a change in the state of the event.

13. The system as claimed in claim 12, wherein the session initiation protocol event message comprises a session initiation protocol subscribe request.

14. The system as claimed in claim 12, wherein the service executer is configured to transport information in a session initiation protocol NOTIFY message.

15. An apparatus having a processor, comprising:
   a receiver configured to receive an session initiation protocol event message including a first identifier configured to identify a user specific event created by a user and a second identifier configured to identify a unit configured to provide the user specific event;
   a subscriber configured to subscribe the requestor to the event in response to receiving a request generated and transmitted by a user equipment;

a selector configured to select an executable set of instructions, the selector further configured to map the first identifier into executable sets of instructions and fetch the selected executable set of instructions from storage, the executable set of instructions being configured to control communications associated with the user specific event based on the first and second identifiers, wherein controlling comprises monitoring for a change in a state of the event and transmitting a message to a requestor in response to detection of a change in the state of the event; and a transmitter configured to communicate session initiation protocol event messages to the user equipment.

16. The apparatus as claimed in claim 15, wherein the session initiation protocol event message comprises a session initiation protocol SUBSCRIBE message.

17. An apparatus having a processor, comprising:

a receiver configured to receive a session initiation protocol event message including a first identifier identifying a user specific event created by a user and a second identifier identifying an origin of the user specific event;

a subscriber configured to subscribe the requestor to the event in response to receiving a request generated and transmitted by a user equipment;

a selector configured to select an executable set of instructions based on the first and second identifiers, the selector further configured to map the first identifier into executable sets of instructions and fetch the selected executable set of instructions from storage; and an executor configured to control communications associated with the user specific event with the executable set of instructions, the executor further configured to monitor for a change in a state of the event and transmit a message to the requestor in response to detection of a change in the state of the event.

18. The apparatus as claimed in claim 17, further comprising:

wherein the session initiation protocol event message comprises a session initiation protocol SUBSCRIBE message.

19. An apparatus having a processor, comprising:

receiving means for receiving a session initiation protocol event message including a first identifier for identifying a user specific event created by a user and a second identifier for identifying a means for providing the user specific event;

subscribing means for subscribing the requestor to the event in response to receiving a request generated and transmitted by a user equipment;

selecting means for selecting an executable set of instructions for controlling communications associated with the user specific event based on the first and second identifiers, wherein the selecting means is for mapping the first identifier into executable sets of instructions and for fetching the selected executable set of instructions from storage;

controlling means for controlling communications associated with the user specific event with the selected executable set of instructions, wherein the controlling means is for monitoring for a change in a state of the event and for transmitting a message to the requestor in response to detection of a change in the state of the event; and transmitting means for communicating session initiation protocol event messages to the user equipment.

20. The apparatus as claimed in claim 19, wherein the session initiation protocol event message comprises a session initiation protocol SUBSCRIBE message.

21. A computer program embodied on a computer-readable medium, the computer program configured to control a processor to perform operations comprising:

receiving from a requestor a session initiation protocol event message comprising a first identifier that identifies a user specific event created by a user and a second identifier that identifies an origin of the user specific event;

subscribing the requestor to the event in response to receiving a request generated and transmitted by a user equipment;

selecting an executable set of instructions based on the first and second identifiers, wherein the selecting comprises mapping the first identifier into executable sets of instructions and fetching the selected executable set of instructions from storage; and controlling communications associated with the user specific event with the selected executable set of instructions, wherein the controlling comprises monitoring for a change in a state of the event and transmitting a message to the requestor in response to detection of a change in the state of the event.

* * * * *